United States Patent
Braun et al.

(10) Patent No.: US 8,184,067 B1
(45) Date of Patent: May 22, 2012

(54) NOSE BRIDGE SENSOR

(75) Inventors: Max Braun, San Francisco, CA (US); Ryan Geiss, San Jose, CA (US); Harvey Ho, Mountain View, CA (US); Thad Eugene Starner, Mountain View, CA (US); Gabriel Taubman, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/186,639

(22) Filed: Jul. 20, 2011

(51) Int. Cl.
*G09G 5/00* (2006.01)

(52) U.S. Cl. ....... 345/7; 345/8; 345/9; 351/41; 351/124; 351/131; 351/136; 348/53

(58) Field of Classification Search .................. 345/7–9; 2/6.1, 6.6, 9, 410, 422, 423, 424; 348/E5.145, 348/E13.036, E13.041, 53; 351/41, 124, 351/131, 132, 136; 359/618, 629, 630, 642, 359/643, 811, 815
See application file for complete search history.

(56) References Cited

U.S. PATENT DOCUMENTS

| | | | |
|---|---|---|---|
| 5,506,730 A | 4/1996 | Morley et al. | |
| 5,585,871 A | 12/1996 | Linden | |
| 5,615,132 A | 3/1997 | Horton et al. | |
| 5,635,948 A * | 6/1997 | Tonosaki | 345/8 |
| 6,431,705 B1 | 8/2002 | Linden | |
| 7,123,215 B2 * | 10/2006 | Nakada | 345/8 |
| 7,216,973 B2 * | 5/2007 | Jannard et al. | 351/158 |
| 7,315,254 B2 | 1/2008 | Smith et al. | |
| 7,542,012 B2 | 6/2009 | Kato et al. | |
| 7,593,757 B2 | 9/2009 | Yamasaki | |
| 7,648,463 B1 | 1/2010 | Ellhag et al. | |

(Continued)

FOREIGN PATENT DOCUMENTS

JP  62157007  7/1987

OTHER PUBLICATIONS

Koss B., Sieber A. "Head Mounted Display for Diving Computer Platform", Journal of Display Technology, vol. 7, Issue 4, pp. 193-199, Apr. 2011. Retrieved from the internet on May 4, 2011 from: http://ieeexplore.ieee.org/xpl/freeabs_all.jsp?arnumber=5724749.

*Primary Examiner* — Lun-Yi Lao
*Assistant Examiner* — Priyank Shah
(74) *Attorney, Agent, or Firm* — McDonnell Boehnen Hulbert & Berghoff LLP

(57) ABSTRACT

Systems and methods for selecting an action associated with a power state transition of a head-mounted display (HMD) in the form of eyeglasses are disclosed. A signal may be received from a sensor on a nose bridge of the eyeglasses indicating if the HMD is in use. Based on the received signal, a first powers state for the HMD may be determined. Responsive to the determined first power state, an action associated with a power state transition of the HMD from an existing power state to the first power state may be selected. The action may be selected from among a plurality of actions associated with a plurality of state transitions. Also, the action may be a sequence of functions performed by the HMD including modifying an operating state of a primary processing component of the HMD and a detector of the HMD configured to image an environment.

20 Claims, 6 Drawing Sheets

U.S. PATENT DOCUMENTS

| | | |
|---|---|---|
| 7,677,723 B2 | 3/2010 | Howell et al. |
| 8,049,680 B2 * | 11/2011 | Spruck et al. .................... 345/8 |
| 2008/0068559 A1 | 3/2008 | Howell et al. |
| 2009/0234614 A1 | 9/2009 | Kahn et al. |
| 2010/0079356 A1 | 4/2010 | Hoellwarth |
| 2010/0149073 A1 * | 6/2010 | Chaum et al. .................... 345/8 |
| 2010/0295769 A1 | 11/2010 | Lundstrom |
| 2011/0012896 A1 | 1/2011 | Ji |
| 2011/0080289 A1 | 4/2011 | Minton |
| 2011/0156998 A1 | 6/2011 | Huang et al. |
| 2011/0227820 A1 | 9/2011 | Haddick et al. |
| 2011/0231757 A1 | 9/2011 | Haddick et al. |
| 2011/0267321 A1 * | 11/2011 | Hayakawa .................. 345/204 |

\* cited by examiner

NOSE BRIDGE SENSOR

FIELD

This disclosure relates to sensors on wearable computing devices, and in examples, to actions performed in response to signals provided from the sensors.

BACKGROUND

At a simple level, sensors are devices that may capture data, and in response provide a signal. The use of sensors is commonly utilized when a need arises to measure and convert physical quantities into signals. Examples of types of sensors include acoustic, chemical, electrical, optical, or flow sensors to name a few.

A wearable computing device may include sensors for sensing any of a number of physical, environmental, or operational elements. A processor of the wearable computing device may be configured to perform actions in response to the signals provided by the sensors. For example, a tactile sensor on a wearable computing device may be used to detect inputs from a user of the wearable computing device. An accelerometer may detect motion of the wearable computing device and provide information to the user.

In one example, eyeglasses with an on-board computing system and projector may be configured as an example of a wearable computing device. The lens elements of the eyeglasses may suitably display a projected image or graphic. The lens elements may also be sufficiently transparent to allow a user to see through the lens element. The two features of the lens elements may be combined to form a heads-up display system. Additionally, the system may be connected to or affixed within a head-mounted structure to create a head-mounted display.

SUMMARY

This disclosure may disclose, inter alia, devices and methods for selecting an action associated with a power state transition of a head-mounted display (HMD) in a form of eyeglasses based on a signal received from a sensor on a nose bridge of the eyeglasses.

In one example, a method for selecting an action is provided. In the method, a signal is received from a sensor on a HMD indicating if the HMD is in use. The HMD may be in a form of eyeglasses and the sensor may be coupled to a nose bridge of the eyeglasses. The method includes, but is not limited to, determining a first power state for the HMD based on the received signal. The method further includes selecting an action being associated with a power state transition of the HMD from an existing power state to the first power state in response to the determined first power state. The action may be selected from among a plurality of actions associated with a plurality of power state transitions. Also, the action may comprise a sequence of functions performed by the HMD including modifying an operating state of a primary processing component of the HMD and modifying an operating state of a detector of the HMD configured to image an environment.

In another example, a non-transitory computer-readable medium with instructions stored thereon is provided. The instructions contain instructions executable by a computing device. The instructions may be executable for receiving a signal from a sensor on a HMD indicating if the HMD is in use. The HMD may be in a form of eyeglasses and the sensor may be coupled to a nose bridge of the eyeglasses. The instructions may be further executable for determining a first power state for the HMD based on the received signal. The instructions may also be executable for selecting an action being associated with a power state transition of the HMD from an existing power state to the first power state in response to the determined first power state. The action may be selected from among a plurality of actions associated with a plurality of power state transitions. Also, the action may comprise a sequence of functions performed by the HMD including modifying an operating state of a primary processing component of the HMD and modifying an operating state of a detector of the HMD configured to image an environment.

In another example, a head-mounted display (HMD) is provided. The head-mounted display comprises a sensor on the HMD configured to provide a signal indicating if the HMD is in use. The HMD may be in a form of eyeglasses and the sensor may be coupled to a nose bridge of the eyeglasses. The HMD also includes a memory and a power management component configured to determine a first power state for the HMD based on the signal. The HMD further includes a processor coupled to the memory and the power management component. The processor may be configured to, select an action being associated with a power state transition of the HMD from an existing power state to the first power state in response to the determined first power state. The action may be selected from among a plurality of actions associated with a plurality of power state transitions. Also, the action may comprise a sequence of functions performed by the HMD including modifying an operating state of a primary processing component of the HMD and modifying an operating state of a detector of the HMD configured to image an environment.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, devices and methods for selecting an action being associated with a power state transition of a head-mounted display (HMD) based on a signal received from a sensor on the HMD. The HMD may be in a form of traditional eyeglasses, and the sensor may be coupled to a nose bridge of the eyeglasses. Additionally, the sensor coupled to the nose bridge may be attached or coupled to one or more nose pads of the eyeglasses. Based on a signal received from the sensor, a first power state for the HMD may be determined. In response to the determined first power state, an action being associated with a power state transition of the HMD from an existing power state to the first power state may be selected.

For example, the power state transition may comprise a transition from an on power state to an off power state. The determined first power state may be the off power state, while the existing power state may be the on power state. Other power states and power state transitions exist as well. Accordingly, the action associated with the power state transition may be selected from among a plurality of actions associated with a plurality of power state transitions.

The action associated with the power state transition may comprise a sequence of functions performed by the HMD including modifying an operating state of a primary processing component of the HMD and modifying an operating state of a detector of the HMD configured to image an environment.

In one example, one or more of a plurality of components of the HMD (e.g., a display element) may be instructed to modify an operating parameter value. The operating parameter value may be associated with a level of power consumption. For example, modifying the operating parameter value may alter the power consumption of a component of the HMD, such that the overall power consumption of the HMD is also changed.

In another example, the signal from the sensor on the HMD may be received continuously. After a predetermined delay period, the first power state for the HMD may be determined based on the received signal.

Figure 1:
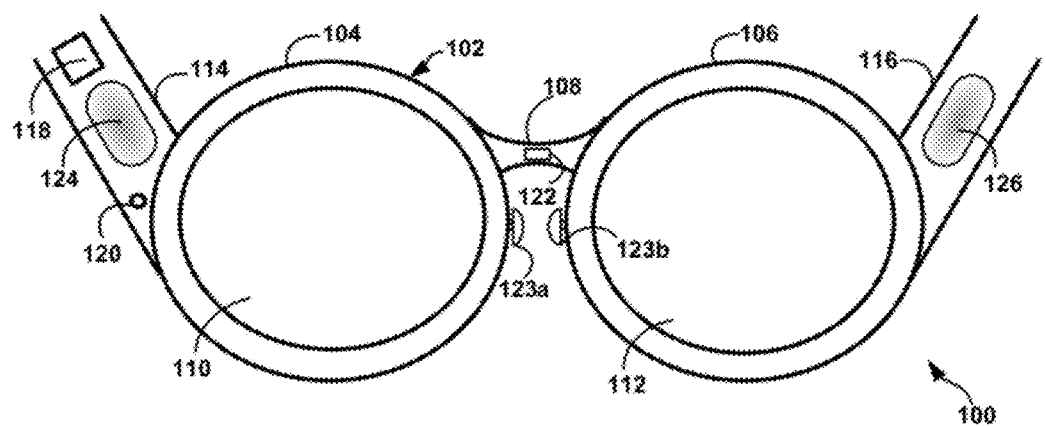
FIG. 1 illustrates an example system.

Referring now to the figures, FIG. 1 illustrates an example system 100. The system 100 is shown in the form of a wearable computing device. While FIG. 1 illustrates eyeglasses 102 as an example of a wearable computing device, other types of wearable computing devices could additionally or alternatively be used. As illustrated in FIG. 1, the eyeglasses 102 comprise frame elements including lens-frames 104 and 106 and a center frame support 108, lens elements 110 and 112, and extending side-arms 114 and 116. The center frame support 108 and the extending side-arms 114 and 116 are configured to secure the eyeglasses 102 to a user's face via a user's nose and ears, respectively. Each of the frame elements 104, 106, and 108 and the extending side-arms 114 and 116 may be formed of a solid structure of plastic or metal, or may be formed of a hollow structure of similar material so as to allow wiring and component interconnects to be internally routed through the eyeglasses 102. Each of the lens elements 110 and 112 may be formed of a material configured to display a projected image or graphic. Each of the lens elements 110 and 112 may also be sufficiently transparent to allow a user to see through the lens element. In one example, combining these two features of the lens elements 110 and 112 can facilitate an augmented reality or heads-up display where a projected image or graphic may be superimposed over a real-world view as perceived by the user through the lens elements 110 and 112. However, example wearable computing devices as eyeglasses 112 without a display element are also contemplated.

The extending side-arms 114 and 116 are each projections that extend away from the frame elements 104 and 106, respectively, and are positioned behind a user's ears to secure the eyeglasses 102 to the user. The extending side-arms 114 and 116 may further secure the eyeglasses 102 to the user by extending around a rear portion of the user's head. Additionally or alternatively, for example, the system 100 may connect to or be affixed within a head-mounted helmet structure. Other possibilities exist as well.

Although the system 100 is illustrated as traditional eyeglasses 102, the system 100 and term eyeglasses 102 may also describe a wearable computing device in the form of a monocular device (not shown). For example, the system 100 may be a modular device comprising a single lens element which may be coupled to a head-mounted structure. In one example, system 100 may not include the lens-frames 104, 106 and lens elements 110, 112. The modular device may be coupled to one of the extending side-arms 114, 116 or the center frame support 108. For example, the center frame support 108 may connect the extending side-arms 114, 116.

In one example, the modular device may be coupled to the inner side (i.e., the side exposed to a portion of a user's head when worn by the user) of an extending side-arm 114. A frame or support of the modular device may allow the single lens element to be positioned in front of or proximate to a user's eye when the head-mounted structure is worn by a user. For example, the single lens element may be positioned below the center frame support 108 which may be connecting the extending side-arms 114, 116. In another example, the single lens element may be provided adjacent to or over one of the lens elements 110, 112. Thus, the term eyeglasses 102 may be broadly defined to include a head-mounted device comprising a frame and at least one lens element.

The system 100 may also include an on-board computing system 118, a detector 120, a sensor 122, and finger-operable touchpad input devices 124, 126. The on-board computing system 118 is shown to be positioned on the extending side-arm 114 of the eyeglasses 102; however, the on-board computing system 118 may be provided on other parts of the eyeglasses 102.

The on-board computing system 118 may be configured to receive and analyze data from the detector 120, the sensor 122, and the finger-operable touchpad input devices 124, 126 (and possibly from other sensory devices, user interfaces, or both) and generate images for output to the lens elements 110 and 112. The on-board computing system 118 may include a processor and memory, for example.

The detector 120 is shown to be positioned on the extending side-arm 114 of the eyeglasses 102; however, the detector 120 may be provided on other parts of the eyeglasses 102. The detector 120 may be configured to image an environment. For example, the detector 120 may transform data of an environment into a replica of the environment in a different form (e.g., change digital data to pixels of a display). In some examples, the detector 120 may be a device that converts an optical image into an electrical signal. For example, the detector 120 may be a camera, a charge-coupled device (CCD), a complementary metal-oxide-semiconductor (CMOS) active pixel sensor, and an infrared camera, an infrared range or depth detector configured to interpret a three-dimensional scene using continuously-projected infrared light, among other types of detectors.

Additionally, the detector 120 may capture images at various resolutions or at different frame rates. For example, the detector 120 may be a video camera. Many video cameras with a small form-factor, such as those used in cell phones or webcams, for example, may be incorporated into an example of the system 100. Although FIG. 1 illustrates one detector 120, more detectors may be used, and each may be configured to capture the same view, or to capture different views. For example, the detector 120 may be forward facing to capture at least a portion of the real-world view perceived by the user. This forward facing image captured by the detector 120 may then be used to generate an augmented reality where computer generated images appear to interact with the real-world view perceived by the user.

The sensor 122 is shown coupled to the nose bridge 108 of the eyeglasses 102; however, the sensor 122 may be provided on other parts of the eyeglasses 102. For example, the sensor may be coupled to one or more nose pads 123a, 123b, of the eyeglasses 102. The sensor 122 may be positioned on one of extending side-arms 114 or 116 (or both), or other areas of the eyeglasses 102 as well. In addition, the sensor 122 may make use of software or hardware resources of the system 100 to capture data and produce a signal.

In one example, the sensor 122 may include multiple sensing components or devices. A first sensing component may include or be coupled to nose pad 123a and a second sensing component may include or be coupled to nose pad 123b. The first sensing component and second sensing component may operate together in some embodiments. For example the first sensing component may output a signal which may be received by the second sensing component. Alternatively, the first sensing component and second sensing component may be similar or dissimilar types of sensors operating independently. The first sensing component and second sensing component may each receive a signal which may be analyzed individually by the sensor 122 or the on-board computing system 118 to make a determination.

Additionally, in some examples, the sensor 122 may receive signals from sensing components coupled to the nose bridge as well as sensing components coupled to one or more of the nose pads 123a, 123b of the eyeglasses 102. Numerous combinations of sensing components of the sensor 122 and locations of the sensing components exist for producing the received signal from the sensor 122.

The sensor 122 may include an infrared proximity sensor or infrared trip sensor, for example. In one example, the infrared proximity sensor may be a photodiode configured to emit infrared radiation and measure an intensity of infrared radiation scattered back to the photodiode. In another example, the infrared trip sensor may be operated between nose pads 123a, 123b of the eyeglasses 102 and configured to detect disruptions in an infrared beam produced between the nose pads 123a, 123b. Alternatively, the sensor 122 may include a conductivity, resistivity, or capacitive sensor, optionally operated between the nose pads 123a, 123b as well.

The sensor 122 may include a sonar sensor, such that sensor 122 or on-board computing system 118 uses sonar to generate a signal. Moreover, the sensor 122 may be an ultrasonic sensor or microphone. For example, signals from the microphone may be analyzed to identify a pattern caused by breathing. Based on the analysis, a determination may be made that the HMD is being worn on a face of a user, for example. Other sensing components or devices may be included within the sensor 122 or other sensing functions may be performed by the sensor 122.

The finger-operable touchpad input devices 124, 126 are shown mounted on the extending side-arms 114, 116 of the eyeglasses 102. Each of finger-operable touchpad input devices 124, 126 may be used by a user to input commands. The finger-operable touchpad input devices 124, 126 may sense at least one of a position and a movement of a finger via capacitive sensing, resistance sensing, or a surface acoustic wave process, among other possibilities. The finger-operable touchpad input devices 124, 126 may be capable of sensing finger movement in a direction parallel or planar to the pad surface, in a direction normal to the pad surface, or both, and may also be capable of sensing a level of pressure applied. The finger-operable touchpad input devices 124, 126 may be capable of sensing finger movement or movement of an object with or without contact to the touchpad input devices 124, 126. For example, the touchpad input devices 124, 126 may be capable of proximity detection. The finger-operable touchpad input devices 124, 126 may be formed of one or more translucent or transparent insulating layers and one or more translucent or transparent conducting layers. Edges of the finger-operable touchpad input devices 124, 126 may be formed to have a raised, indented, or roughened surface, so as to provide tactile feedback to a user when the user's finger reaches the edge of the finger-operable touchpad input devices 124, 126. Each of the finger-operable touchpad input devices 124, 126 may be operated independently, and may provide a different function. The finger-operable touchpad input devices 124, 126 may control a cursor on a display on the lens elements 110, 112.

Figure 2:
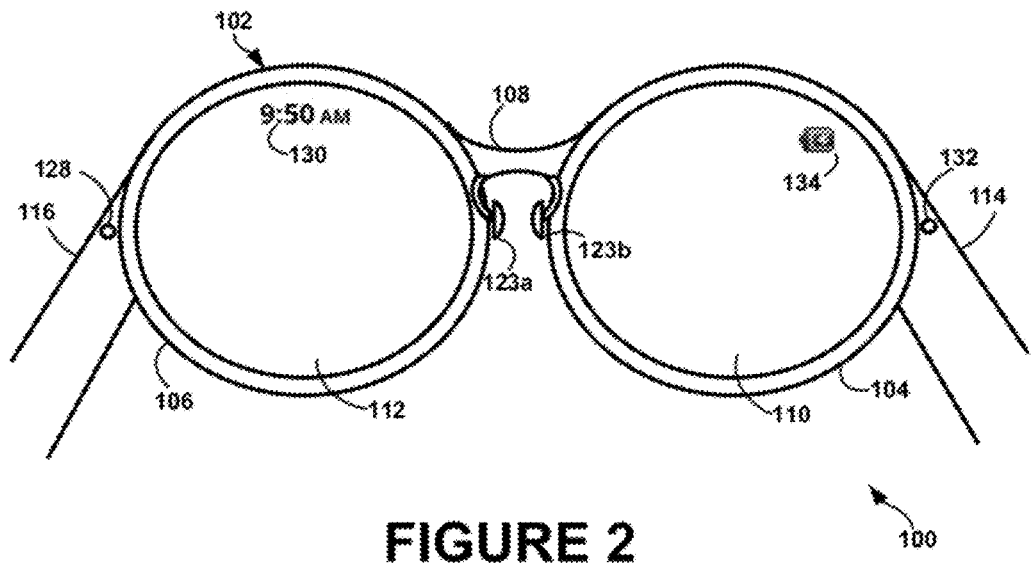
FIG. 2 illustrates an alternative view of the system of FIG. 1.

FIG. 2 illustrates an alternate view of the system 100 of FIG. 1. As shown in FIG. 2, the lens elements 110 and 112 may act as display elements. The eyeglasses 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and may be configured to project a display 134 onto an inside surface of the lens element 110.

The lens elements 110 and 112 may act as a combiner in a light projection system and may include a coating that reflects the light projected onto the lens elements 110 and 112 from the projectors 128 and 132. In some embodiments, a special coating may not be used (e.g., when the projectors 128 and 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104 and 106 for driving such a matrix display. Alternatively or additionally, a laser or LED source and scanning system could be used to draw a raster display directly onto the retina of one or more of the user's eyes. Other possibilities exist as well.

Figure 3:
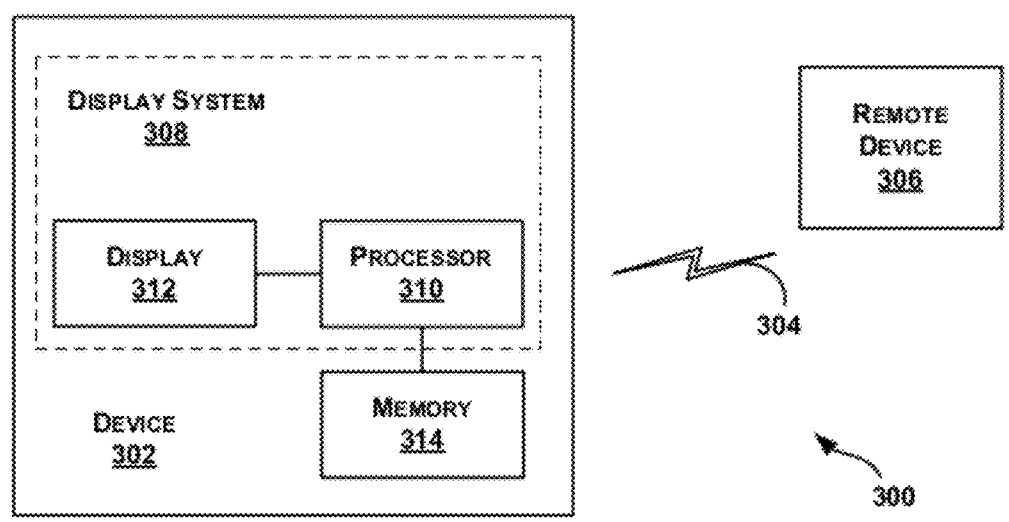
FIG. 3 illustrates an example schematic figure of a computer network infrastructure in which a wearable computing device may operate.

Referring now to FIG. 3, an example schematic figure of a computer network infrastructure 300 is illustrated, in which a wearable computing device may operate. The computer network infrastructure 300 includes a device 302 configured to communicate using a communication link 304 (e.g., a wired or wireless connection) to a remote device 306. The device 302 may be any type of device that can receive data and display information corresponding to or associated with the data. For example, the device 302 may be a heads-up display system, such as the eyeglasses 102 described with reference to FIGS. 1 and 2.

Thus, the device 302 may include a display system 308 comprising a processor 310 and a display 312. The display 312 may be, for example, an optical see-through display, an optical see-around display, or a video see-through display. The processor 310 may receive data from the remote device 306, and configure the data for display on the display 312. The processor 310 may be any type of processor, such as a microprocessor or a digital signal processor, for example.

The device 302 may further include on-board data storage, such as memory 314, coupled to the processor 310. The memory 314 may store software that can be accessed and executed by the processor 310, for example. The memory 314 may be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis.

The remote device 306 may be any type of computing device or transmitter including a laptop computer, a mobile telephone, etc., that is configured to transmit data to the device 302. The remote device 306 and the device 302 may contain hardware to enable the communication link 304, such as processors, transmitters, receivers, antennas, etc.

In FIG. 3, the communication link 304 is illustrated as a wireless connection. The wireless connection may include using, for example, Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Wired connections may also be used. For example, the communication link 304 may be a wired link via a serial bus such as a universal serial bus or a parallel bus. A wired connection may be a proprietary connection as well. The remote device 306 may be accessible, using wired or wireless links, via the Internet and may comprise a computing cluster associated with a particular web service (e.g., social-networking, photo sharing, address book, etc.).

Figure 4:
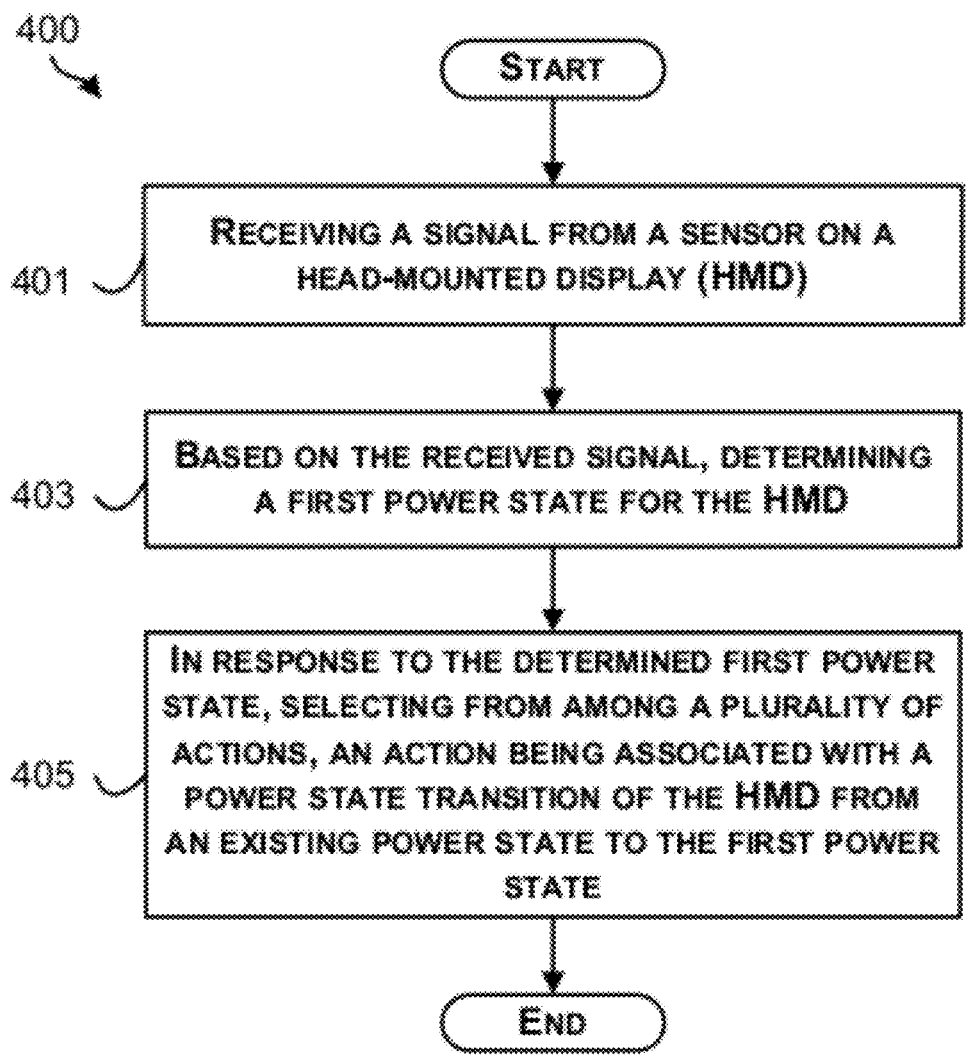
FIG. 4 is an example block diagram of a method to select an action associated with a power state transition of a head-mounted display, in accordance with at least some embodiments described herein.

FIG. 4 is an example block diagram of a method 400 to select an action associated with a power state transition of a head-mounted display, in accordance with at least some embodiments described herein. The method 400 shown in FIG. 4 presents an embodiment of a method that may, for example, be used by the system 100 of FIG. 1. Method 400 may include one or more operations, functions, or actions as illustrated by one or more of blocks 401-405. Although the blocks are illustrated in a sequential order, these blocks may also be performed in parallel, and/or in a different order than those described herein. Also, the various blocks may be combined into fewer blocks, divided into additional blocks, and/or removed from the method, based upon the desired implementation of the method.

In addition, for the method 400 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and random access memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 400 and other processes and methods disclosed herein, each block in FIG. 4 may represent circuitry that is wired to perform the specific logical functions in the process.

Initially, at block 401, the method 400 includes receiving a signal from a sensor on a head-mounted display (HMD). The HMD may be in a form of eyeglasses and the sensor may be coupled to a nose bridge of the eyeglasses. The sensor may also be attached to one or more nose pads of the eyeglasses. Furthermore, the received signal may indicate if the HMD is in use (or not in use). For example, the received signal may be used to determine when and/or whether the HMD may be on a user's face. Similarly, the received signal may be used to determine when the HMD is taken off or put on by the user.

In one example, the method 400 may include continuously receiving the signal from the sensor. Likewise, the signal may be received periodically, on a fixed-interval basis. The power required to operate the sensor may be lower than the power required to operate all, or a portion, of the components of the HMD. Therefore, the sensor may be operated to determine when the HMD is in use, and allow the HMD to efficiently allocate power resources based on the determination. In some examples, a length of time the HMD may be operated on a single charge of a rechargeable battery may be augmented.

At block 403, the method 400 includes based on the received signal, determining a first power state for the HMD. For example, the presence, or lack of the received signal, a magnitude or pattern of the received signal, or other characteristics of the received signal may be analyzed to determine the first power state. Examples of a first power state may include an on power state, an off power state, a sleep-mode state, a power-save state, among other possibilities.

In one example, the sensor may be an infrared proximity sensor configured to emit infrared radiation. When the intensity or magnitude of the infrared radiation scattered back to the sensor is above a threshold, the HMD may determine that the first power state is an on power state. The on power state may indicate the HMD is in use by a user. Conversely, when the intensity of the infrared radiation scattered back to the sensor is below a threshold, the HMD may determine that the first power state is an off power state.

In another example, the sensor may be an infrared trip sensor operated between two nose pads of the eyeglasses. The received signal may vary depending on whether the user's nose breaks an infrared beam or plane between the two nose pads. The received signal may then be analyzed to determine the first power state.

In other examples, other characteristics of the received signal may indicate and be associated with power states based on the type of sensor. For example, the sensor may be a resistive, conductive, or capacitive sensor. The HMD may be able to distinguish and determine the first power state based on learned characteristics of the received signals. The received signal may indicate a value of resistance, conductance, or capacitance which may vary based on whether the HMD is on a user's face. The user's nose, or another part of the user's face may impact the resistance, conductance, of capacitance captured by the sensor, and correspondingly alter the value of the received signal from the sensor. In the example of a conductive sensor, two electrodes may be coupled to two nose pads of the eyeglasses and configured to measure the conductance between the electrodes. In the example of a capacitive sensor, a capacitance value may vary depending on the presence of the user or the user's flesh. Values of resistance, conductance, capacitance, or other values may be compared with predetermined thresholds to determine the first power state.

In one example, the sensor may include a microphone. The method 400 may further include analyzing the received signal to identify a pattern caused by breathing. The analysis may lead to the determination that the HMD is being worn on the face of the user. Therefore, the first power state may be determined to be an on power state.

In some examples, the method 400 may include determining the first power state for the HMD based on the received signal after a predetermined delay period. After analyzing the signal from the sensor, the HMD may delay by a predetermined period (e.g., one second) before determining the first power state. This may help prevent false positive detection of removal of the HMD from a user's face due to a bump or jolt, for instance.

In some examples, the method 400 may include determining the first power state for the HMD based on signals received from multiple sensors. For example, a determination may be made based on the signal received from the nose bridge sensor that the HMD may have been removed from a user's nose. However, analyzing a signal received from a second sensor, optionally positioned on one or more extending side-arms of the HMD may indicate contact with a user's ear. Combining information of the two signals may lead to an inference that the HMD may have been lifted from a nose of a user but are still in contact with the side of a user's head (e.g., a user may lift an HMD to rub the user's eyes or nose). In one example, power state transitions may be ignored when the inference is determined.

In other examples, the determined first power state may be determined based on knowledge of an existing power state. For example, after a predetermined time period of an existing sleep power state, an off power state may be determined based on the received signal. The received signal may have substantially no change from a signal received when determining the existing power state. Subsequently, the off power state may be determined.

In another example, a combination of sensors coupled to the nose bridge of the eyeglasses may be used to determine the first power state. Multiple signals from the combination of sensors may be received. Moreover, based on an individual analysis of the received multiple signals, the first power state for the HMD may be determined.

At block 405, the method 400 includes in response to the determined first power state, selecting from among a plurality of actions, an action being associated with a power state transition of the HMD from an existing power state to the first power state. A plurality of actions may be associated with a plurality of state transitions. Also, the action may include a sequence of functions performed by the HMD including modifying an operating state of a primary processing component of the HMD and modifying an operating state of a detector of the HMD configured to image an environment.

In one example, the existing power state may be an on power state, while the determined power state may be an off power state. In response to the determined first power state, the HMD may select an action associated with a power state transition from the on power state to the off power state. In another example, the existing power state may be an on power state, while the determined power state may be a sleep power state. In another example, the power state transition may be a transition from a sleep power state to an on power state. Another example power state transition includes a transition from a power-save power state to an off power state.

Accordingly, the action may include modifying the operating state of a primary processing component (e.g., the on-board computing system 118 of FIG. 1) and modifying an operating state of the detector. Modifying the operating states may include the HMD executing a power-off routine or power-on routine, wherein the operating state of the primary processing component and the detector are toggled on or off.

In some examples, the action associated with a power state transition may also include the HMD instructing a display element to enter a sleep-mode and instructing a communication module to enter a sleep-mode. The action associated with a power state transition to an off power state or sleep power state may include locking a display screen of the HMD and powering off an input device for interacting with the display screen.

Another possible action associated with a power state transition may optionally include the HMD entering a power-save mode and/or instructing the HMD to provide a prompt for authentication to operate the HMD when, based on the received signal, a new power state is determined. Authentication may then be required before some or all of the functions of the device can be accessed by the user. Yet another possible action associated with a power state transition to a power-on state includes instructing a display element to power-up and instructing a camera to power-up.

A further possible action associated with a power state transition may include changing a security state of the HMD. In one example, the power state transition may be a transition from an off power state or sleep power state to an on power state. The action associated with a power state transition may include an authentication or re-authentication method. For example, voice print, iris scan, facial image, etc., may be required to authenticate a user prior to permitting access to or operation of the HMD.

In some examples, the method 400 may further include instructing one or more of a plurality of components of the HMD to modify an operating parameter value. The operating parameter value may be associated with a level of power consumption. The one or more of the plurality of components may include, for example, any combination of a display element, a video camera, a projector, an on-board computing system, an input device, and a communication module. In one example, the HMD may include electrophotochromic lenses and a decision may be made whether or not to power the shading of the lenses based on a power state transition.

In one example, the action associated with the power state transition may further include sending a notification to a server indicating the first power state of the HMD. For example, upon detecting that the HMD has been removed from a user's face, a notification can be sent to others that the user is going offline. Additionally, based on the power state transition, the server may close applications, sign the user out of applications, or take other actions with respect to online resources. Similarly, based on the power state transition, a decision may be made whether or not to route incoming messages, calls, etc., to the HMD, or to a secondary device. In one example, a decision may be made whether or not to auto-broadcast information sensed by the HMD (e.g., audio or video information), based on the power state transition. Based on the power state transition, a decision may be made how frequently to ping servers for updates or messages.

Figure 5:
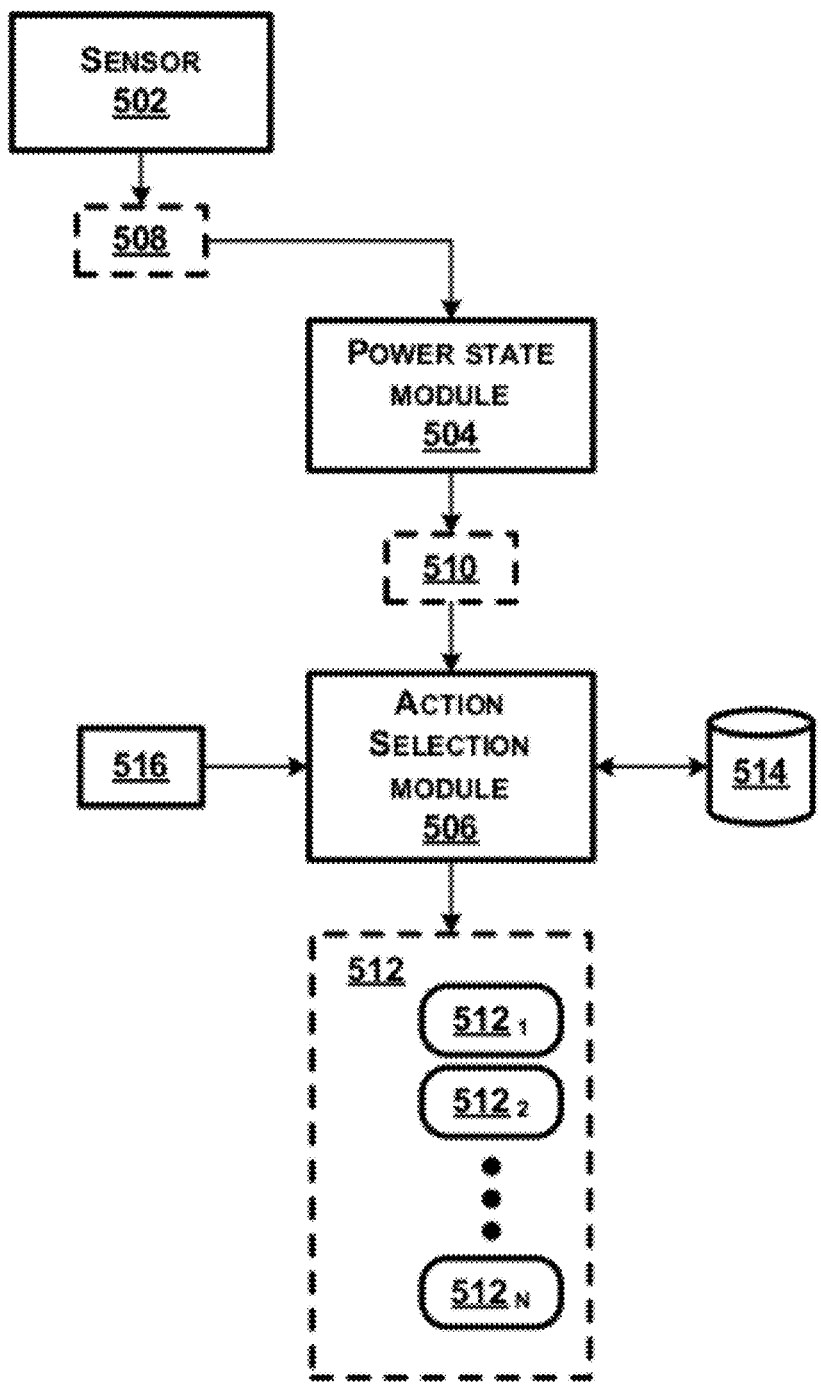
FIG. 5 illustrates an example flow diagram, in accordance with at least some embodiments described herein.

FIG. 5 illustrates an example flow diagram, in accordance with at least some embodiments described herein. FIG. 5 illustrates a method involving a sensor 502, a power state module 504, and an action selection module 506. Functions of the power state module 504 and action selection module 506 may each be a segment, or a portion of program code, which includes one or more instructions executable by a processor for implementing specific logical functions or steps in the process.

In one example, the sensor 502 may use various types of hardware, sensor arrays, or software to capture data and provide a signal 508 to the power state module 504 of a head-mounted display (HMD). The signal 508 may indicate whether the HMD is in use or not in use.

Based on the received signal, the power state module 504 may determine a first power state 510. The first power state 510 may be responsively provided to the action selection module 506. Accordingly, the action selection module 506 may select, from among a plurality of actions, an action 512 being associated with a power state transition of the HMD. The action 512 may comprise a sequence of functions $512_1$, $512_2$, ... $512_N$ performed by the HMD. For example, the sequence of functions $512_1$, $512_2$, ... $512_N$ may include modifying an operating state of a primary processing component of the HMD and modifying an operating state of a detector of the HMD configured to image an environment. The sequence of functions $512_1$, $512_2$, ... $512_N$ may also include modifying an operating parameter value of a display element or other component of the HMD.

In one example, the action selection module 506 may access a database 514 to select the action 512 from among a plurality of actions associated with a plurality of power state transitions. The database 514 may be stored locally within memory of the HMD. Alternatively, the database 514 may be accessed via a network and a server.

In one example, the action selection module 506 may make use of an existing power state 516 to determine the power state transition and corresponding action. For example, the action selection module 506 may access a lookup table to determine the action 512. The lookup table may require as inputs the existing power state 516 and first power state 510. In other examples, the action selection module 506 may make use of other algorithms or methods for selecting the action 512.

Figure 6:
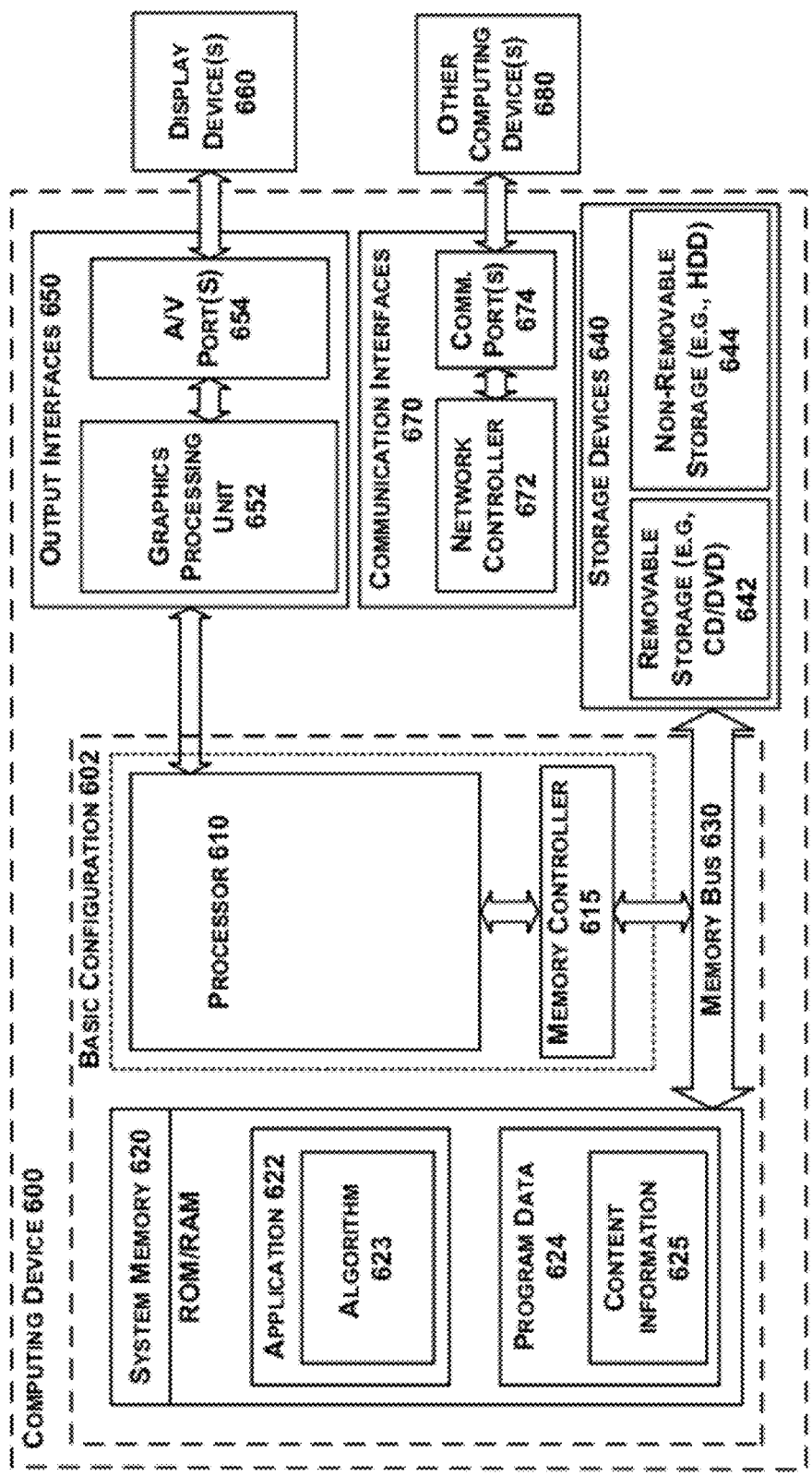
FIG. 6 is a functional block diagram illustrating an example computing device used in a computing system that is arranged in accordance with at least some embodiments described herein.

FIG. 6 is a functional block diagram illustrating an example computing device 600 used in a computing system that is arranged in accordance with at least some embodiments described herein. The computing device may be a personal computer, mobile device, cellular phone, touch-sensitive wristwatch, tablet computer, video game system, or global positioning system, and may be implemented to select an action associated with a power state transition of a head-mounted display (HMD) based on a signal received from a sensor as described in FIGS. 1-5. In a very basic configuration 602, computing device 600 may typically include one or more processors 610 and system memory 620. A memory bus 630 can be used for communicating between the processor 610 and the system memory 620. Depending on the desired configuration, processor 610 can be of any type including but not limited to a microprocessor (µP), a microcontroller (µC), a digital signal processor (DSP), or any combination thereof. A memory controller 615 can also be used with the processor 610, or in some implementations, the memory controller 615 can be an internal part of the processor 610.

Depending on the desired configuration, the system memory 620 can be of any type including but not limited to volatile memory (such as RAM), non-volatile memory (such as ROM, flash memory, etc.) or any combination thereof. System memory 620 may include one or more applications 622, and program data 624. Application 622 may include an algorithm 623 that is arranged to provide inputs to the electronic circuits, in accordance with the present disclosure. Program data 624 may include content information 625 that could be directed to any number of types of data. In some example embodiments, application 622 can be arranged to operate with program data 624 on an operating system.

Computing device 600 can have additional features or functionality, and additional interfaces to facilitate communications between the basic configuration 602 and any devices and interfaces. For example, data storage devices 640 can be provided including removable storage devices 642, non-removable storage devices 644, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 620 and storage devices 640 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media can be part of device 600.

Computing device 600 can also include output interfaces 650 that may include a graphics processing unit 652, which can be configured to communicate to various external devices such as display devices 660 or speakers via one or more A/V ports or a communication interface 670. The communication interface 670 may include a network controller 672, which can be arranged to facilitate communications with one or more other computing devices 680 over a network communication via one or more communication ports 674. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 600 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 can also be implemented as a personal computer including both laptop computer and non-laptop computer configurations.

Figure 7:
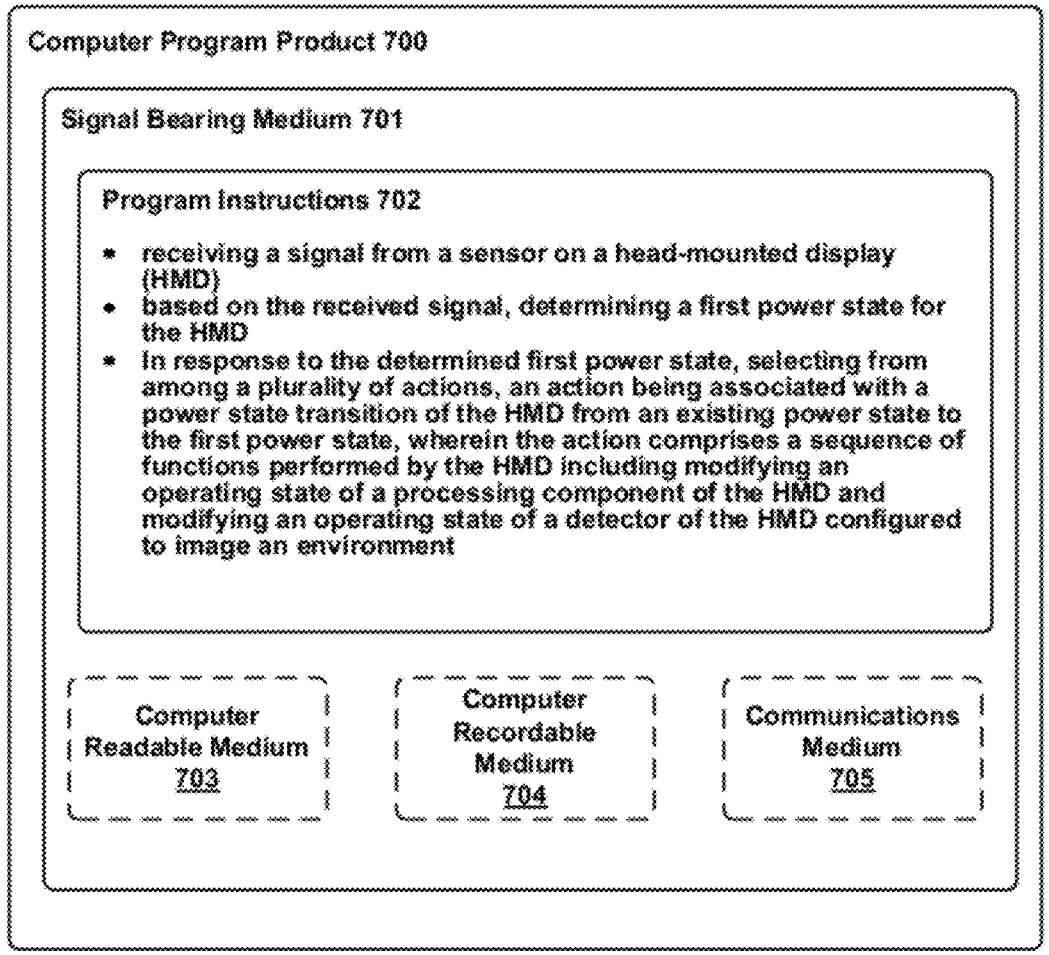
FIG. 7 is a schematic illustrating a conceptual partial view of an example computer program product that includes a computer program for executing a computer process on a computing device, arranged according to at least some embodiments presented herein.

In some embodiments, the disclosed methods may be implemented as computer program instructions encoded on a non-transitory computer-readable storage media in a machine-readable format, or on other non-transitory media or articles of manufacture. FIG. 7 is a schematic illustrating a conceptual partial view of an example computer program product 700 that includes a computer program for executing a computer process on a computing device, arranged according to at least some embodiments presented herein. In one embodiment, the example computer program product 700 is provided using a signal bearing medium 701. The signal bearing medium 701 may include one or more programming instructions 702 that, when executed by one or more processors may provide functionality or portions of the functionality described above with respect to FIGS. 1-6. Thus, for example, referring to the embodiments shown in FIG. 4, one or more features of blocks 401-405 may be undertaken by one or more instructions associated with the signal bearing medium 701.

In some examples, the signal bearing medium 701 may encompass a computer-readable medium 703, such as, but not limited to, a hard disk drive, a Compact Disc (CD), a Digital Video Disk (DVD), a digital tape, memory, etc. In some implementations, the signal bearing medium 701 may encompass a computer recordable medium 704, such as, but not limited to, memory, read/write (R/W) CDs, R/W DVDs, etc. In some implementations, the signal bearing medium 701 may encompass a communications medium 705, such as, but not limited to, a digital and/or an analog communication medium (e.g., a fiber optic cable, a waveguide, a wired communications link, a wireless communication link, etc.). Thus, for example, the signal bearing medium 701 may be conveyed by a wireless form of the communications medium 705 (e.g., a wireless communications medium conforming with the IEEE 802.11 standard or other transmission protocol).

The one or more programming instructions 702 may be, for example, computer executable and/or logic implemented instructions. In some examples, a computing device such as the computing device 600 of FIG. 6 may be configured to provide various operations, functions, or actions in response to the programming instructions 702 conveyed to the computing device 600 by one or more of the computer readable medium 703, the computer recordable medium 704, and/or the communications medium 705.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
receiving an output from a sensor on a head-mounted display (HMD), wherein the HMD is in a form of eyeglasses and the sensor is coupled to a nose bridge of the eyeglasses, wherein the sensor comprises a first sensing component that outputs a signal which is received by a second sensing component and used to determine the output, wherein the output indicates if the HMD is in use;
based on the output, determining a first power state for the HMD; and
in response to the determined first power state, selecting from among a plurality of actions, an action being associated with a power state transition of the HMD from an existing power state to the first power state, wherein a plurality of actions are associated with a plurality of power state transitions, and wherein the action comprises a sequence of functions performed by the HMD including modifying an operating state of a processing component of the HMD and modifying an operating state of a detector of the HMD configured to image an environment.

2. The method of claim 1, wherein the sensor coupled to the nose bridge is attached to one or more nose pads of the eyeglasses.

3. The method of claim 1, wherein the sensor comprises an infrared proximity sensor.

4. The method of claim 1, wherein the sensor comprises an infrared trip sensor operated between two nose pads of the eyeglasses.

5. The method of claim 1, wherein the sensor comprises a conductivity sensor used to sense a conductivity between two electrodes attached to two nose pads of the eyeglasses.

6. The method of claim 1, wherein the sensor comprises a resistivity sensor.

7. The method of claim 1, wherein the sensor comprises a capacitive sensor.

8. The method of claim 1, wherein the sensor comprises a microphone, the method further comprising analyzing the output to identify a pattern caused by breathing.

9. The method of claim 8, further comprising, based on the analysis, making a determination that the HMD is being worn by a user.

10. The method of claim 1, further comprising
receiving multiple signals from a combination of sensors coupled to the nose bridge; and
based on an individual analysis of the received multiple signals, determining the first power state for the HMD.

11. The method of claim 1, further comprising:
receiving the output from the sensor on the HMD; and
after a predetermined delay period, determining the first power state for the HMD based on the output.

12. The method of claim 1, further comprising instructing one or more of a plurality of components of the HMD to modify an operating parameter value, wherein the operating parameter value is associated with a level of power consumption, wherein the one or more of the plurality of components of the HMD comprises one or more of the following:
a display element, a video camera, a projector, an on-board computing system, an input device, and a communication module.

13. The method of claim 1, wherein the action associated with the power state transition further comprises:

the HMD entering a power-save mode; and instructing the HMD to provide a prompt for authentication to operate the HMD when, based on the output, a new power state is determined.

14. The method of claim 1, wherein the action associated with the power state transition further comprises:

locking a display screen of the HMD; and powering off an input device for interacting with the display screen.

15. The method of claim 1, wherein the action associated with the power state transition further comprises sending a notification to a server indicating the first power state of the HMD.

16. The method of claim 1, wherein the first power state is a power-on state, and wherein the action associated with the power state transition further comprises instructing a display element to power-up and instructing a camera to power-up.

17. A non-transitory computer readable medium having stored therein instructions executable by a computing device to cause the computing device to perform functions of:

receiving an output from a sensor on a head-mounted display (HMD), wherein the HMD is in a form of eyeglasses and the sensor is coupled to a nose bridge of the eyeglasses, wherein the sensor comprises a first sensing component that outputs a signal which is received by a second sensing component and used to determine the output, wherein the output indicates if the HMD is in use;

based on the output, determining a first power state for the HMD; and in response to the determined first power state, selecting from among a plurality of actions, an action being associated with a power state transition of the HMD from an existing power state to the first power state, wherein a plurality of actions are associated with a plurality of power state transitions, and wherein the action comprises a sequence of functions performed by the HMD including modifying an operating state of a processing component of the HMD and modifying an operating state of a detector of the HMD configured to image an environment.

18. The computer readable medium of claim 17, further comprising instructions executable to perform functions of:

selecting the action associated with the power state transition of the HMD, wherein the action associated with the power state transition further comprises instructing a display element to enter a sleep-mode and instructing a communication module to enter a sleep-mode.

19. A head-mounted display (HMD) comprising:

a memory;

a sensor on the HMD, the sensor configured to provide an output indicating if the HMD is in use based on a signal that is output from a first sensing component and received by a second sensing component, wherein the HMD is in a form of eyeglasses and the sensor is coupled to a nose bridge of the eyeglasses;

a power management component configured to determine a first power state for the HMD based on the output; and a processor coupled to the memory and the power management component, the processor configured to:

in response to the determined first power state, select from among a plurality of actions, an action being associated with a power state transition of the HMD from an existing power state to the first power state, wherein a plurality of actions are associated with a plurality of power state transitions, and wherein the action comprises a sequence of functions performed by the HMD including modifying an operating state of the processor of the HMD and modifying an operating state of a detector of the HMD configured to image an environment.

20. The HMD of claim 19, wherein the power state transition comprises a transition from an on power state to an off power state.

* * * * *